US012171390B2

(12) United States Patent
Feddema

(10) Patent No.: US 12,171,390 B2
(45) Date of Patent: Dec. 24, 2024

(54) DISHWASHER

(71) Applicant: Whirlpool Corporation, Benton Harbor, MI (US)

(72) Inventor: Mark S. Feddema, Kalamazoo, MI (US)

(73) Assignee: Whirlpool Corporation, Benton Harbor, MI (US)

(*) Notice: Subject to any disclaimer, the term of this patent is extended or adjusted under 35 U.S.C. 154(b) by 118 days.

(21) Appl. No.: 17/460,503

(22) Filed: Aug. 30, 2021

(65) Prior Publication Data

US 2023/0066054 A1 Mar. 2, 2023

(51) Int. Cl.

| | |
|---|---|
| ***A47L 15/42*** | (2006.01) |
| ***A47L 15/16*** | (2006.01) |
| ***A47L 15/50*** | (2006.01) |
| ***B05B 12/10*** | (2006.01) |
| ***B05B 12/16*** | (2018.01) |

(52) U.S. Cl.

CPC ........... *A47L 15/4282* (2013.01); *A47L 15/16* (2013.01); *A47L 15/4287* (2013.01); *A47L 15/50* (2013.01); *B05B 12/10* (2013.01); *B05B 12/16* (2018.02); *A47L 2401/12* (2013.01); *A47L 2501/20* (2013.01)

(58) Field of Classification Search

CPC .. A47L 15/4282; A47L 15/16; A47L 15/4287; A47L 15/50; A47L 2401/12; A47L 2501/20; A47L 15/4278; B05B 12/10; B05B 12/16

See application file for complete search history.

(56) References Cited

U.S. PATENT DOCUMENTS

| | | | | |
|---|---|---|---|---|
| 6,795,981 | B2 | 9/2004 | Sato et al. | |
| 9,420,938 | B2 | 8/2016 | Forst et al. | |
| 9,693,672 | B2 | 7/2017 | Feddema | |
| 10,143,353 | B2 * | 12/2018 | Jung | A47L 15/4221 |
| 2021/0177237 | A1 * | 6/2021 | Feddema | A47L 15/4221 |

FOREIGN PATENT DOCUMENTS

| | | | | |
|---|---|---|---|---|
| CN | 100449101 C * | 1/2009 | | A47L 15/4259 |
| DE | 102011052846 A * | 5/2012 | | A47L 15/22 |
| DE | 102012103445 A1 | 10/2013 | | |
| DE | 102012103445 B * | 10/2018 | | A47L 15/22 |
| DE | 102012103445 B4 * | 10/2018 | | A47L 15/22 |
| DE | 102020123582 A1 | 4/2021 | | |
| EP | 1334687 A1 | 8/2003 | | |
| WO | WO-2008029222 A2 * | 3/2008 | | A47L 15/508 |

OTHER PUBLICATIONS

DE-102012103445-B4 Written Description (Year: 2018).*
CN-100449101-C Written Description (Year: 2009).*
WO-2008029222-A2 Written Description (Year: 2008).*
DE-102011052846-A1 Written Description (Year: 2012).*

* cited by examiner

*Primary Examiner* — Douglas Lee
*Assistant Examiner* — Emily H Yasharpour
(74) *Attorney, Agent, or Firm* — McGarry Bair PC

(57) ABSTRACT

A dishwasher and method for treating dishes according to a cycle of operation, the dishwasher comprising a tub at least partially defining a treating chamber and a dish rack movably received within the treating chamber. The dishwasher configured for receiving dishes for treatment during the cycle of operation, and moveable relative to the tub. A sprayer located within the treating chamber, configured to emit spray into the dish rack, where a diverter and thermally-responsive actuator within the sprayer can change the direction of the spray.

16 Claims, 11 Drawing Sheets

DISHWASHER

BACKGROUND

Contemporary automatic dishwashers for use in a typical household can include a tub and one or more dish holders, such as upper and lower racks or baskets, for supporting soiled dishes within the tub. Optionally, some dishwashers come with a third or top rack located in the tub above the upper rack. A spray system is provided for re-circulating wash liquid throughout the tub to remove soils from the dishes loaded into the racks. The dishwasher can also include a controller that implements a number of pre-programmed cycles of operation to wash dishes contained in the tub.

BRIEF DESCRIPTION

The disclosure relates to a dishwasher for treating dishes according to a cycle of operation, the dishwasher comprising a tub at least partially defining a treating chamber, a dish rack received within the treating chamber, configured for receiving the dishes for treatment during the cycle of operation, and moveable relative to the tub, and a stationary sprayer located within the treating chamber, configured to emit spray into the dish rack, the stationary sprayer comprising a sprayer housing defining an interior and an exterior, with at least one nozzle passing through the sprayer housing to fluidly couple the interior with the exterior, a diverter located in the interior and moveable relative to the at least one nozzle, and a thermally-responsive actuator located in the interior and operably coupled to the diverter to move the diverter relative to the at least one nozzle in response to a temperature of the spray emitted from the interior through the at least one nozzle.

Another aspect of the disclosure relates to a method for changing a direction of spray from a sprayer located in a treating chamber of a dishwasher, the method comprising flowing fluid at a first temperature that is below a first predetermined temperature into a sprayer housing of a stationary sprayer, wherein the fluid exits the sprayer housing into the treating chamber through at least one nozzle, flowing fluid at a second temperature, greater than the first temperature, wherein the second temperature is at or greater than the first predetermined temperature and less than a second predetermined temperature, and moving a diverter operably coupled to a thermally-responsive actuator and located at an interior of the sprayer housing, from a first position to a second position in response to the fluid flowing at the second temperature, wherein a portion of the diverter occludes at least a portion of the at least one nozzle when the diverter is in the second position.

Yet another aspect of the disclosure relates to a dishwasher for treating dishes according to a cycle of operation, the dishwasher comprising a tub at least partially defining a treating chamber, a dish rack received within the treating chamber, configured for receiving the dishes for treatment during the cycle of operation, and a sprayer located within the treating chamber, configured to emit spray into the dish rack, the sprayer comprising a sprayer housing defining an interior and an exterior, with at least one nozzle passing through the sprayer housing to fluidly couple the interior with the exterior, and a baffle assembly located in the interior, the baffle assembly comprising a diverter moveable relative to the at least one nozzle, a thermally-responsive actuator coupled at an unrestrained end to the diverter and coupled at a restrained end to an interior surface, and a set of pulleys coupled to the interior surface, wherein the set of pulleys receive a portion of the thermally-responsive actuator between the restrained end and the unrestrained end, wherein an increased distance between the restrained end of the thermally-responsive actuator and a first pulley of the set of pulleys provides tension required to move the diverter from a first position to a second position.

DETAILED DESCRIPTION

Figure 1:
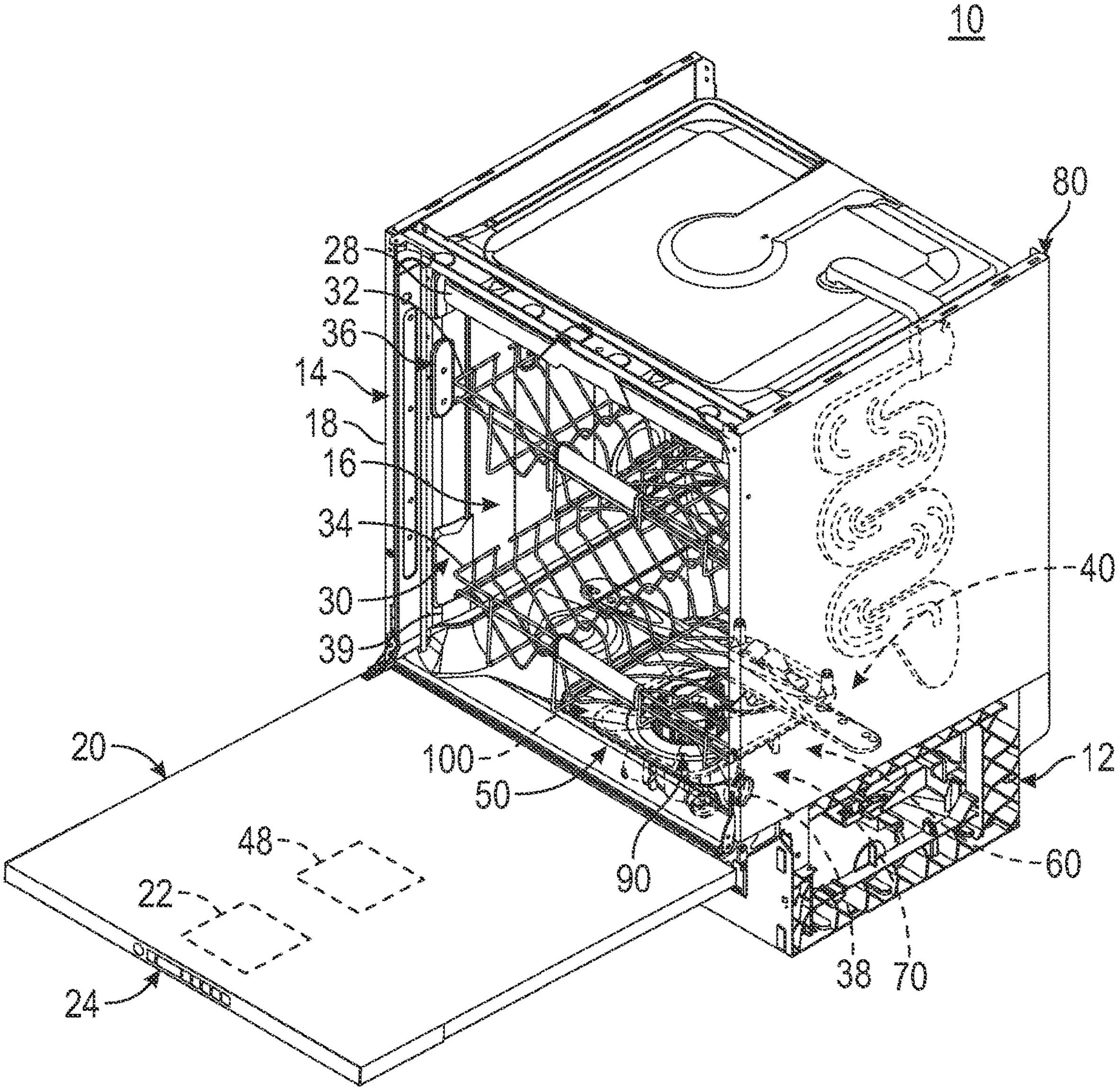
FIG. 1 is a right-side perspective view of an automatic dishwasher having multiple systems for implementing an automatic cycle of operation.

FIG. 1 illustrates an automatic dishwasher 10 capable of implementing an automatic cycle of operation to treat dishes. As used in this description, the term "dish(es)" is intended to be generic to any item, single or plural, that can be treated in the dishwasher 10, including, without limitation, dishes, plates, pots, bowls, pans, glassware, and silverware. As illustrated, the dishwasher 10 is a built-in dishwasher implementation, which is designed for mounting under a countertop. However, this description is applicable to other dishwasher implementations such as a stand-alone, drawer-type or a sink-type, for example.

The dishwasher 10 has a variety of systems, some of which are controllable, to implement the automatic cycle of operation. A chassis is provided to support the variety of systems needed to implement the automatic cycle of operation. As illustrated, for a built-in implementation, the chassis includes a frame in the form of a base 12 on which is supported an open-faced tub 14, which at least partially defines a treating chamber 16, having an open face 18, for receiving the dishes. A closure in the form of a door assembly 20 is pivotally mounted to the base 12 for movement between opened and closed positions to selectively open and close the open face 18 of the tub 14. Thus, the door assembly 20 provides selective accessibility to the treating chamber 16 for the loading and unloading of dishes or other items. While illustrated as a single panel, multiple parts can together define the door assembly 20.

The chassis, as in the case of the built-in dishwasher implementation, can be formed by other parts of the dishwasher 10, like the tub 14 and the door assembly 20, in addition to a dedicated frame structure, like the base 12, with them all collectively forming a uni-body frame to which the variety of systems are supported. In other implementations, like the drawer-type dishwasher, the chassis can be a tub that is slidable relative to a frame, with the closure being a part of the chassis or the countertop of the surrounding cabinetry. In a sink-type implementation, the sink forms the tub and the cover closing the open top of the sink forms the closure. Sink-type implementations are more commonly found in recreational vehicles.

The systems supported by the chassis, while essentially limitless, can include dish holding system 30, spray system 40, recirculation system 50, drain system 60, water supply system 70, drying system 80, heating system 90, and filter system 100. These systems are used to implement one or more treating cycles of operation for the dishes, for which there are many, and one of which includes a traditional automatic wash cycle.

A basic traditional automatic wash cycle of operation has a wash phase, where a detergent/water mixture is recirculated and then drained, which is then followed by a rinse phase where water alone or with a rinse agent is recirculated and then drained. An optional drying phase can follow the rinse phase. More commonly, the automatic wash cycle has multiple wash phases and multiple rinse phases. The multiple wash phases can include a pre-wash phase where water, with or without detergent, is sprayed or recirculated on the dishes, and can include a dwell or soaking phase. There can be more than one pre-wash phases. A wash phase, where water with detergent is recirculated on the dishes, follows the pre-wash phases. There can be more than one wash phase; the number of which can be sensor controlled based on the amount of sensed soils in the wash liquid. One or more rinse phases will follow the wash phase(s), and, in some cases, come between wash phases. The number of wash phases can also be sensor controlled based on the amount of sensed soils in the rinse liquid. The wash phases and rinse phases can include the heating of the water, even to the point of one or more of the phases being hot enough for long enough to sanitize the dishes. A drying phase can follow the rinse phase(s). The drying phase can include a drip dry, heated dry, condensing dry, air dry or any combination.

A controller 22 can also be included in the dishwasher 10 and operably couples with and controls the various components of the dishwasher 10 to implement the cycle of operation. The controller 22 can be located within the door assembly 20 as illustrated, or it can alternatively be located somewhere within the chassis. The controller 22 can also be operably coupled with a control panel or user interface 24 for receiving user-selected inputs and communicating information to the user. The user interface 24 can include operational controls such as dials, lights, switches, and displays enabling a user to input commands, such as a cycle of operation, to the controller 22 and receive information.

The dish holding system 30 can include any suitable structure for holding dishes within the treating chamber 16. Exemplary dish holders are illustrated in the form of upper dish racks 32 and lower dish rack 34, commonly referred to as "racks", which are located within or moveably received by the treating chamber 16. The upper dish racks 32 and the lower dish rack 34 are typically mounted for slidable movement in and out of the treating chamber 16 through the open face 18 for ease of loading and unloading. Drawer guides/slides/rails 36 are typically used to slidably mount the upper dish rack 32 to the tub 14. The lower dish rack 34 typically has wheels or rollers 38 that roll along rails 39 formed in sidewalls of the tub 14 and onto the door assembly 20, when the door assembly 20 is in the opened position.

Dedicated dish holders can also be provided. One such dedicated dish holder is a third level rack 28 located above the upper dish rack 32. Like the upper dish rack 32, the third level rack 28 is slidably mounted to the tub 14 with drawer guides/slides/rails 36 and movably received within the treating chamber 16. The third level rack 28 is typically used to hold utensils, such as tableware, spoons, knives, spatulas, etc., in an on-the-side or flat orientation. However, the third level rack 28 is not limited to holding utensils. If an item can fit in the third level rack, it can be washed in the third level rack 28. The third level rack 28 generally has a much shorter height or lower profile than the upper and lower dish racks 32, 34. Typically, the height of the third level rack is short enough that a typical glass cannot be stood vertically in the third level rack 28 and the third level rack 28 still slide into the treating chamber 16.

Another dedicated dish holder can be a silverware basket (not shown), which is typically carried by one of the upper or lower dish racks 32, 34 or mounted to the door assembly 20. The silverware basket typically holds utensils and the like in an upright orientation as compared to the on-the-side or flat orientation of the third level rack 28.

A dispenser assembly 48 is provided to dispense treating chemistry, e.g. detergent, anti-spotting agent, etc., into the treating chamber 16. The dispenser assembly 48 can be mounted on an inner surface of the door assembly 20, as shown, or can be located at other positions within the chassis. The dispenser assembly 48 can dispense one or more types of treating chemistries. The dispenser assembly 48 can be a single-use dispenser or a bulk dispenser, or a combination of both.

Figure 2:
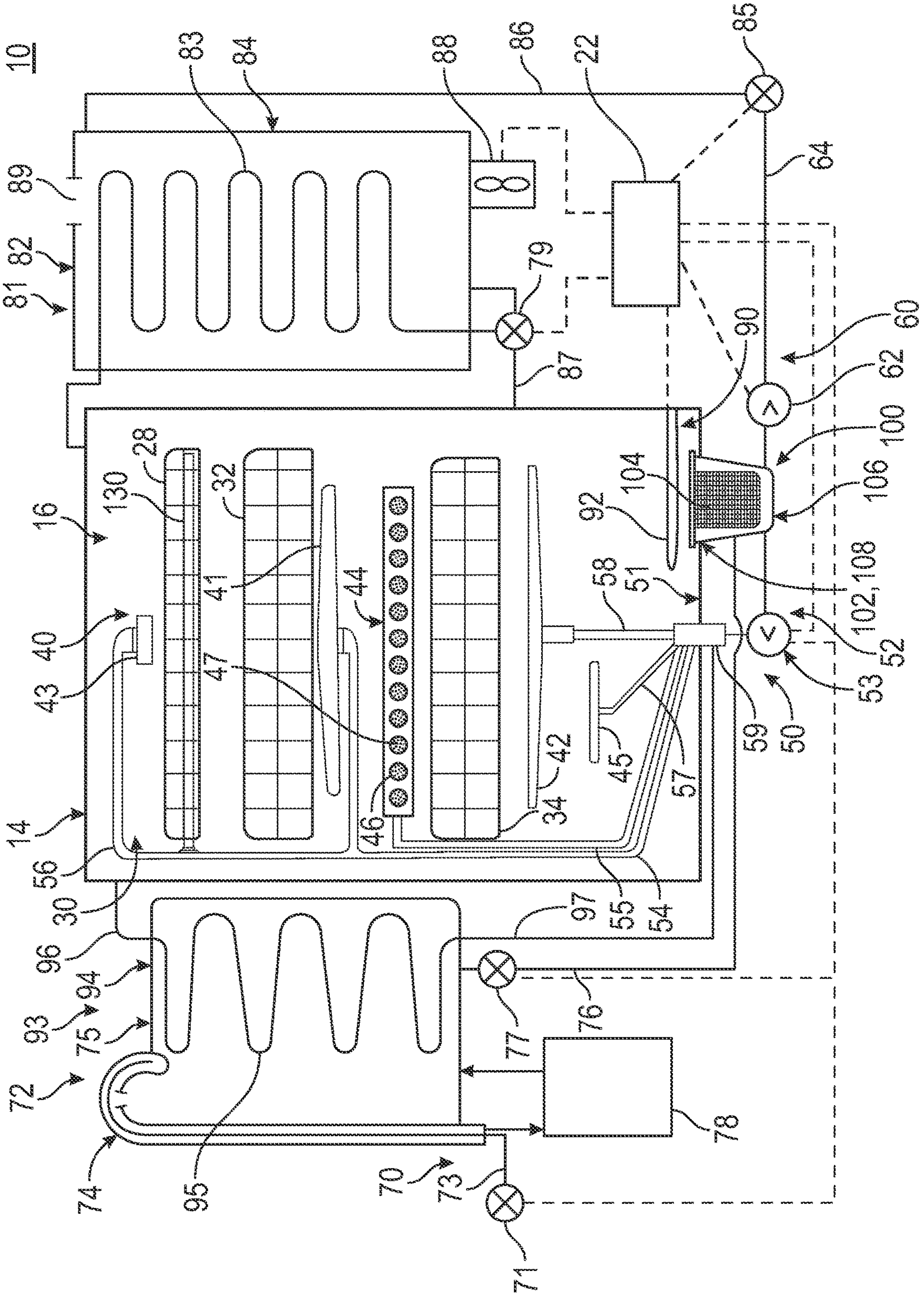
FIG. 2 is a schematic view of the dishwasher of FIG. 1 and illustrating at least some of the plumbing and electrical connections between at least some of systems.

Turning to FIG. 2, the spray system 40 is provided for spraying liquid in the treating chamber 16 and can have multiple spray assemblies or sprayers, some of which can be dedicated to a particular one of the dish holders, to particular area of a dish holder, to a particular type of cleaning, or to a particular level of cleaning, etc. The sprayers can be fixed or movable, such as rotating, relative to the treating chamber 16 or dish holder. Six exemplary sprayers are illustrated and include, an upper spray arm 41, a lower spray arm 42, a third level sprayer 43, a deep-clean sprayer 44, and a spot sprayer 45. The upper spray arm 41 and lower spray arm 42 are illustrated as rotating spray arms, located below the upper dish rack 32 and the lower dish rack 34, respectively, and rotate about a generally centrally located and vertical axis. However, it is contemplated that the upper spray arm 41 or the lower spray arm 42 can be fixed. The third level sprayer 43 is located above the third level rack 28. The third level sprayer 43 is illustrated as being fixed, but could move, such as in rotating. In addition to the third level sprayer 43 or in place of the third level sprayer 43, a sprayer 49, illustrated as a stationary sprayer, can be located at least in part below a portion of the third level rack 28. The sprayer 49 is illustrated as a having a fixed or stationary sprayer housing or tube, carried by the third level rack 28, but the sprayer housing or tube could move, such as, but not limited to, rotating about a longitudinal axis.

The deep-clean sprayer 44 is a manifold extending along a rear wall of the tub 14 and has multiple nozzles 46, with multiple apertures 47, generating an intensified and/or higher pressure spray than the upper spray arm 41, the lower spray arm 42, or the third level sprayer 43. The nozzles 46 can be fixed or move, such as in rotating. The spray emitted by the deep-clean sprayer 44 defines a deep clean zone, which, as illustrated, would like along a rear side of the lower dish rack 34. Thus, dishes needing deep cleaning, such as dishes with baked-on food, can be located in the lower dish rack 34 to face the deep-clean sprayer 44. The deep-clean sprayer 44, while illustrated as only one unit on a rear wall of the tub 14 could comprises multiple units and/or extend along multiple portions, including different walls, of the tub 14, and can be provide above, below or beside any of the dish holders with deep-cleaning is desired.

The spot sprayer 45, like the deep-clean sprayer, can emit an intensified and/or higher pressure spray, especially to a discrete location within one of the dish holders. While the spot sprayer 45 is shown below the lower dish rack 34, it could be adjacent any part of any dish holder or along any wall of the tub where special cleaning is desired. In the illustrated location below the lower dish rack 34, the spot sprayer can be used independently of or in combination with the lower spray arm 42. The spot sprayer 45 can be fixed or can move, such as in rotating.

These six sprayers are illustrative examples of suitable sprayers and are not meant to be limiting as to the type of suitable sprayers.

The recirculation system 50 recirculates the liquid sprayed into the treating chamber 16 by the sprayers of the spray system 40 back to the sprayers to form a recirculation loop or circuit by which liquid can be repeatedly and/or continuously sprayed onto dishes in the dish holders. The recirculation system 50 can include a sump 51 and a pump assembly 52. The sump 51 collects the liquid sprayed in the treating chamber 16 and can be formed by a sloped or recess portion of a bottom wall of the tub 14. The pump assembly 52 can include one or more pumps such as recirculation pump 53. The sump 51 can also be a separate module that is affixed to the bottom wall and include the pump assembly 52.

Multiple supply conduits 54, 55, 56, 57, 58 fluidly couple the sprayers 43, 44, 45, 49 to the recirculation pump 53. A recirculation valve 59 can selectively fluidly couple each of the conduits 54-58 to the recirculation pump 53. While each sprayer 43, 44, 45, 49 is illustrated as having a corresponding dedicated supply conduit 54-58 one or more subsets, comprising multiple sprayers from the total group of sprayers 43, 44, 45, 49, can be supplied by the same conduit, negating the need for a dedicated conduit for each sprayer. For example, a single conduit can supply the upper spray arm 41 and the third level sprayer 43. Another example is that the sprayer 49 is supplied liquid by the conduit 56, which also supplies the third level sprayer 43.

The recirculation valve 59, while illustrated as a single valve, can be implemented with multiple valves. Additionally, one or more of the conduits can be directly coupled to the recirculation pump 53, while one or more of the other conduits can be selectively coupled to the recirculation pump with one or more valves. There are essentially an unlimited number of plumbing schemes to connect the recirculation system 50 to the spray system 40. The illustrated plumbing is not limiting.

A drain system 60 drains liquid from the treating chamber 16. The drain system 60 includes a drain pump 62 fluidly coupled the treating chamber 16 to a drain line 64. As illustrated the drain pump 62 fluidly couples the sump 51 to the drain line 64.

While separate recirculation and drain pumps 53 and 62 are illustrated, a single pump can be used to perform both the recirculating and the draining functions. Alternatively, the drain pump 62 can be used to recirculate liquid in combination with the recirculation pump 53. When both a recirculation pump 53 and drain pump 62 are used, the drain pump 62 is typically more robust than the recirculation pump 53 as the drain pump 62 tends to have to remove solids and soils from the sump 51, unlike the recirculation pump 53, which tends to recirculate liquid which has solids and soils filtered away to some extent.

A water supply system 70 is provided for supplying fresh water to the dishwasher 10 from a household water supply via a household water valve 71. The water supply system 70 includes a water supply unit 72 having a water supply conduit 73 with a siphon break 74. While the water supply conduit 73 can be directly fluidly coupled to the tub 14 or any other portion of the dishwasher 10, the water supply conduit is shown fluidly coupled to a supply tank 75, which can store the supplied water prior to use. The supply tank 75 is fluidly coupled to the sump 51 by a supply line 76, which can include a controllable valve 77 to control when water is released from the supply tank 75 to the sump 51.

The supply tank 75 can be conveniently sized to store a predetermined volume of water, such as a volume required for a phase of the cycle of operation, which is commonly referred to as a "charge" of water. The storing of the water in the supply tank 75 prior to use is beneficial in that the water in the supply tank 75 can be "treated" in some manner, such as softening or heating prior to use.

A water softener 78 is provided with the water supply system 70 to soften the fresh water. The water softener 78 is shown fluidly coupling the water supply conduit 73 to the supply tank 75 so that the supplied water automatically passes through the water softener 78 on the way to the supply tank 75. However, the water softener 78 could directly supply the water to any other part of the dishwasher 10 than the supply tank 75, including directly supplying the tub 14. Alternatively, the water softener 78 can be fluidly coupled downstream of the supply tank 75, such as in-line with the supply line 76. Wherever the water softener 78 is fluidly coupled, it can be done so with controllable valves, such that the use of the water softener 78 is controllable and not mandatory.

A drying system 80 is provided to aid in the drying of the dishes during the drying phase. The drying system as illustrated includes a condensing assembly 81 having a condenser 82 formed of a serpentine conduit 83 with an inlet fluidly coupled to an upper portion of the tub 14 and an outlet fluidly coupled to a lower portion of the tub 14, whereby moisture laden air within the tub 14 is drawn from the upper portion of the tub 14, passed through the serpentine conduit 83, where liquid condenses out of the moisture laden air and is returned to the treating chamber 16 where it ultimately evaporates or is drained via the drain pump 62. The serpentine conduit 83 can be operated in an open loop configuration, where the air is exhausted to atmosphere, a closed loop configuration, where the air is returned to the treating chamber, or a combination of both by operating in one configuration and then the other configuration.

To enhance the rate of condensation, the temperature difference between the exterior of the serpentine conduit 83 and the moisture laden air can be increased by cooling the exterior of the serpentine conduit 83 or the surrounding air. To accomplish this, an optional cooling tank 84 is added to the condensing assembly 81, with the serpentine conduit 83 being located within the cooling tank 84. The cooling tank 84 is fluidly coupled to at least one of the spray system 40, recirculation system 50, drain system 60 or water supply system 70 such that liquid can be supplied to the cooling tank 84. The liquid provided to the cooling tank 84 from any of the systems 40-70 can be selected by source and/or by phase of cycle of operation such that the liquid is at a lower temperature than the moisture laden air or even lower than the ambient air.

As illustrated, the liquid is supplied to the cooling tank 84 by the drain system 60. A valve 85 fluidly connects the drain line 64 to a supply conduit 86 fluidly coupled to the cooling tank 84. A return conduit 87 fluidly connects the cooling tank 84 back to the treating chamber 16 via a return valve 79. In this way a fluid circuit is formed by the drain pump 62, drain line 64, valve 85, supply conduit 86, cooling tank 84, return valve 79 and return conduit 87 through which liquid can be supplied from the treating chamber 16, to the cooling tank 84, and back to the treating chamber 16. Alternatively, the supply conduit 86 could fluidly couple to the drain line 64 if re-use of the water is not desired.

To supply cold water from the household water supply via the household water valve 71 to the cooling tank 84, the water supply system 70 would first supply cold water to the treating chamber 16, then the drain system 60 would supply the cold water in the treating chamber 16 to the cooling tank 84. It should be noted that the supply tank 75 and cooling tank 84 could be configured such that one tank performs both functions.

The drying system 80 can use ambient air, instead of cold water, to cool the exterior of the serpentine conduit 83. In such a configuration, a blower 88 is connected to the cooling tank 84 and can supply ambient air to the interior of the cooling tank 84. The cooling tank 84 can have a vented top 89 to permit the passing through of the ambient air to allow for a steady flow of ambient air blowing over the serpentine conduit 83.

The cooling air from the blower 88 can be used in lieu of the cold water or in combination with the cold water. The cooling air will be used when the cooling tank 84 is not filled with liquid. Advantageously, the use of cooling air or cooling water, or combination of both, can be selected on the site-specific environmental conditions. If ambient air is cooler than the cold water temperature, then the ambient air can be used. If the cold water is cooler than the ambient air, then the cold water can be used. Cost-effectiveness can also be considered or accounted for when selecting between cooling air and cooling water. The blower 88 can be used to dry the interior of the cooling tank 84 after the water has been drained. Suitable temperature sensors for the cold water and the ambient air can be provided and send their temperature signals to the controller 22, which can determine which of the two is colder at any time or phase of the cycle of operation.

A heating system 90 is provided for heating water used in the cycle of operation. The heating system 90 includes a heater 92, such as an immersion heater, located in the treating chamber 16 at a location where it will be immersed by the water supplied to the treating chamber 16. The heater 92 need not be an immersion heater, it can also be an in-line heater located in any of the conduits. There can also be more than one heater 92, including both an immersion heater and an in-line heater.

The heating system 90 can also include a heating circuit 93, which includes a heat exchanger 94, illustrated as a serpentine conduit 95, located within the supply tank 75, with a supply conduit 96 supplying liquid from the treating chamber 16 to the serpentine conduit 95, and a return conduit 97 fluidly coupled to the treating chamber 16. The heating circuit 93 is fluidly coupled to the recirculation pump 53 either directly or via the recirculation valve 59 such that liquid that is heated as part of a cycle of operation can be recirculated through the heat exchanger 94 to transfer the heat to the charge of fresh water residing in the supply tank 75. As most wash phases use liquid that is heated by the heater 92, this heated liquid can then be recirculated through the heating circuit 93 to transfer the heat to the charge of water in the supply tank 75, which is typically used in the next phase of the cycle of operation.

A filter system 100 is provided to filter un-dissolved solids from the liquid in the treating chamber 16. The filter system 100 includes a coarse filter 102 and a fine filter 104, which can be a removable basket 106 residing the sump 51, with the coarse filter 102 being a screen 108 circumscribing the removable basket 106. Additionally, the recirculation system 50 can include a rotating filter in addition to or in place of the either or both of the coarse filter 102 and fine filter 104. Other filter arrangements are contemplated such as an ultra-filtration system.

Figure 3:
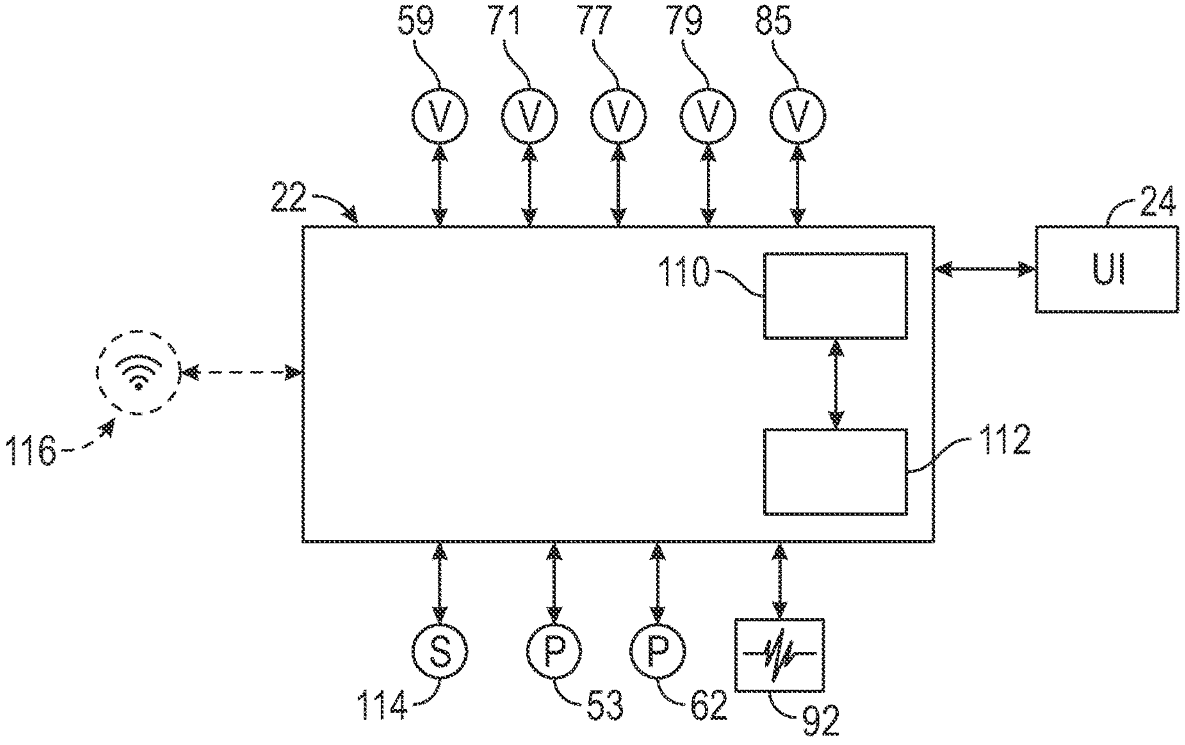
FIG. 3 is a schematic view of a controller of the dishwasher of FIGS. 1 and 2.

As illustrated schematically in FIG. 3, the controller 22 can be coupled with the heater 92 for heating the wash liquid during a cycle of operation, the drain pump 62 for draining liquid from the treating chamber 16, and the recirculation pump 53 for recirculating the wash liquid during the cycle of operation. The controller 22 can be provided with a memory 110 and a central processing unit (CPU) 112. The memory 110 can be used for storing control software that can be executed by the CPU 112 in completing a cycle of operation using the dishwasher 10 and any additional software. For example, the memory 110 can store one or more pre-programmed automatic cycles of operation that can be selected by a user and executed by the dishwasher 10. The controller 22 can also receive input from one or more sensors 114. Non-limiting examples of sensors that can be communicably coupled with the controller 22 include, to name a few, ambient air temperature sensor, treating chamber temperature sensor, water supply temperature sensor, door open/close sensor, and turbidity sensor to determine the soil load associated with a selected grouping of dishes, such as the dishes associated with a particular area of the treating chamber. The controller 22 can also communicate with the recirculation valve 59, the household water valve 71, the controllable valve 77, the return valve 79, and the valve 85. Optionally, the controller 22 can include or communicate with a wireless communication device 116.

Figure 4:
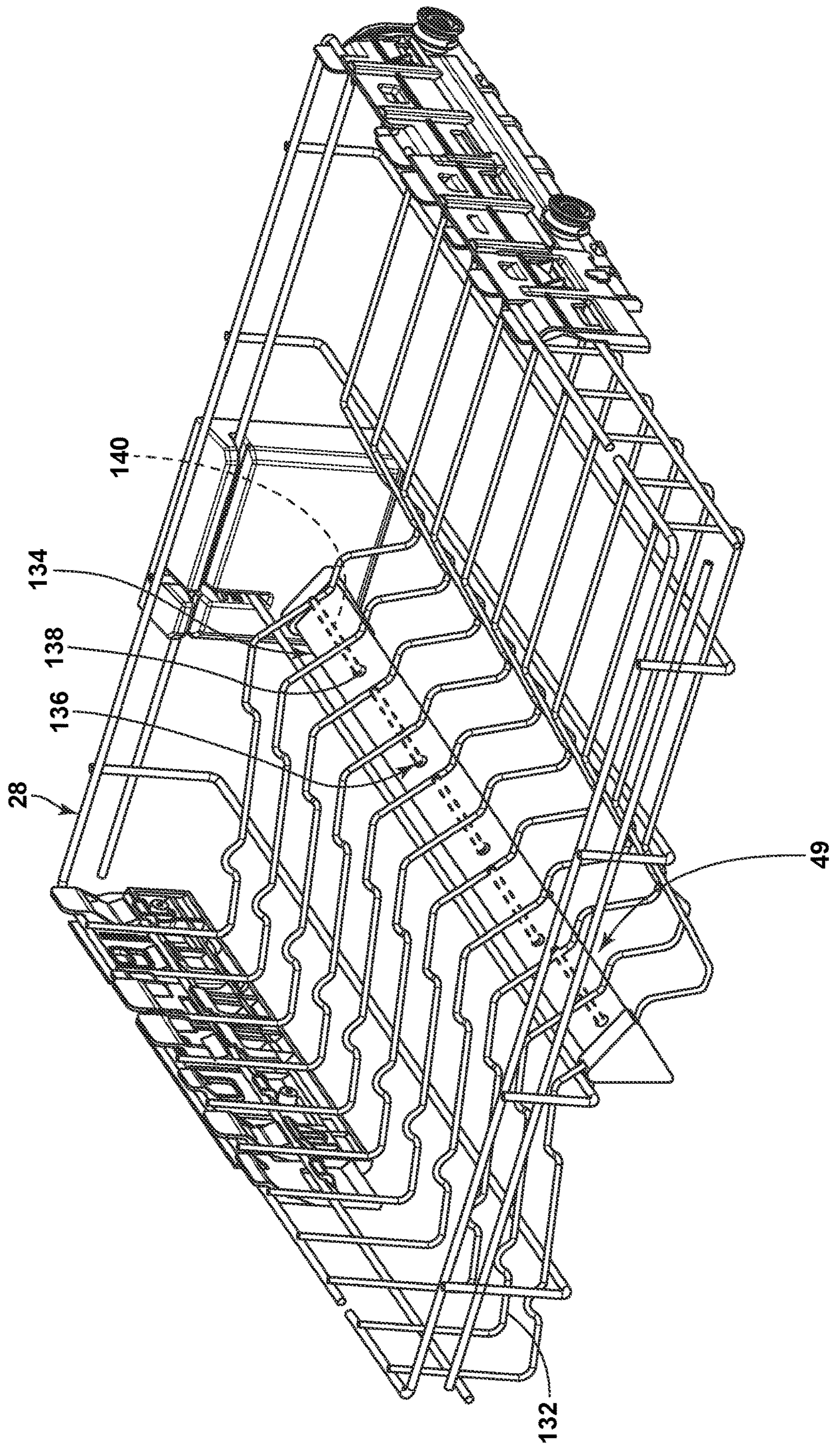
FIG. 4 is a perspective view of a dish holder and a sprayer suitable for use in the automatic dishwasher of FIG. 1.

FIG. 4 is a perspective view of the third level rack or dish holder 28 with the sprayer 49. The dish holder 28 can include wire frame elements 132 forming the rack and defining shapes for retaining dishes. The wire frame elements 132 can be any shape. It is also contemplated that the number of wire frame elements 132 can also vary. The dish holder 28 can include additional structures, retaining devices, or shaping devices such as, but not limited to, a utensil basket.

The sprayer 49, as illustrated by way of non-limiting example, can underlie the dish holder 28. As used herein, the term "underlie" can include any location below at least a portion of the wire frame elements 132. Alternatively, the sprayer 49 can be located above at least a portion of the wire frame elements 132 of the dish holder 28. It is contemplated that the sprayer 49 can underlie or be located above the upper dish rack 32 or the lower dish rack 34. The location of the sprayer 49 is not limiting to its utility.

The sprayer 49 is illustrated, by way of non-limiting example, as a non-rotating or stationary elongated tube. A sprayer housing 134 can be defined by the non-rotating or stationary elongated tube. The sprayer housing 134 is illustrated as stationary, however, it is contemplated that one or more portions of the sprayer housing 134 can rotate. That is, one or more components of the sprayer 49 can rotate, such as about a longitudinal axis of the sprayer housing 134.

The sprayer 49 can be coupled to the dish holder 28 using any known coupling device or combination of coupling devices such as, but not limited to a clasping mechanism, hot air welding, or bayonet mount. Alternatively, one or more portions of the sprayer 49 can be formed unitarily with one or more components of the dish holder 28.

The sprayer housing 134 has a first coefficient of thermal expansion. The first coefficient of thermal expansion can be determined by the materials used to form the sprayer housing 134. One contemplated material for the sprayer housing 134 can include polypropylene. Additionally, or alternatively the sprayer housing 134 can include polytetrafluoroethylene, polyethylene, polyvinyl, polystyrene, or other plastics.

At least one nozzle 136 can be provided on the sprayer 49. While illustrated by way of example as having two nozzles, the at least one nozzle 136 can be a set of or a plurality of nozzles. While "a set of" or "a plurality of" various elements will be described, it will be understood that "a set" or "a plurality" can include any number of the respective elements, including only one element.

The at least one nozzle 136 can pass through the sprayer housing 134. A nozzle outlet 138 of the at least one nozzle 136 allows liquid to enter the treating chamber 16. While illustrated as circular, the outlet 138 can be any shape or combination of basic geometrical shapes. By way of non-limiting example, the outlet 138 can be a rectangle, a square, a circle, a triangle, a trapezium, or any combination therein.

A spray 140 emitted from the at least one nozzle 136 can have at least two characteristics. The at least two characteristics include a spray pattern and a primary spray direction. The spray pattern can, in part, be determined by the shape of the outlet 138. The spray pattern is understood to be the general shape at which the spray 140 is emitted. That is, the spray 140 can be emitted, for example, as a jet spray or stream spray, a fan-like spray pattern, a hollow cone spray pattern, or a misting spray. The jet spray or stream spray can be a spray emitted in a substantially cylindrical straight line. However, it is contemplated that the jet spray can include an arcing trajectory or portion. The fan-like spray pattern can have an expanding cross section where the spray emitted can cover a wide area. The generally hollow cone spray pattern can be a circular spray pattern in which the spray has an outer and inner diameter. The misting spray pattern can include a cloud of spray and can include a steam spray.

The primary spray direction can be a line or curve that best describes the direction of the spray. That is, the primary spray direction can be the path line of fluid at the geometric center of the spray pattern. Additionally, or alternatively, the primary spray direction can be at the centroid of the volume of the spray emitted.

The spray 140 is illustrated, by way of non-limiting example, as having a jet spray pattern in a substantially cylindrical straight line. It is contemplated that the spray 140 can include an arcing portion (not shown). It is further contemplated that the spray 140 can continue past the illustrated region. It also contemplated that the spray 140 can be wider that the illustrated region or include, by way of non-limiting example, a fan-like spray pattern, a hollow cone spray pattern, or a misting spray.

Figure 5:
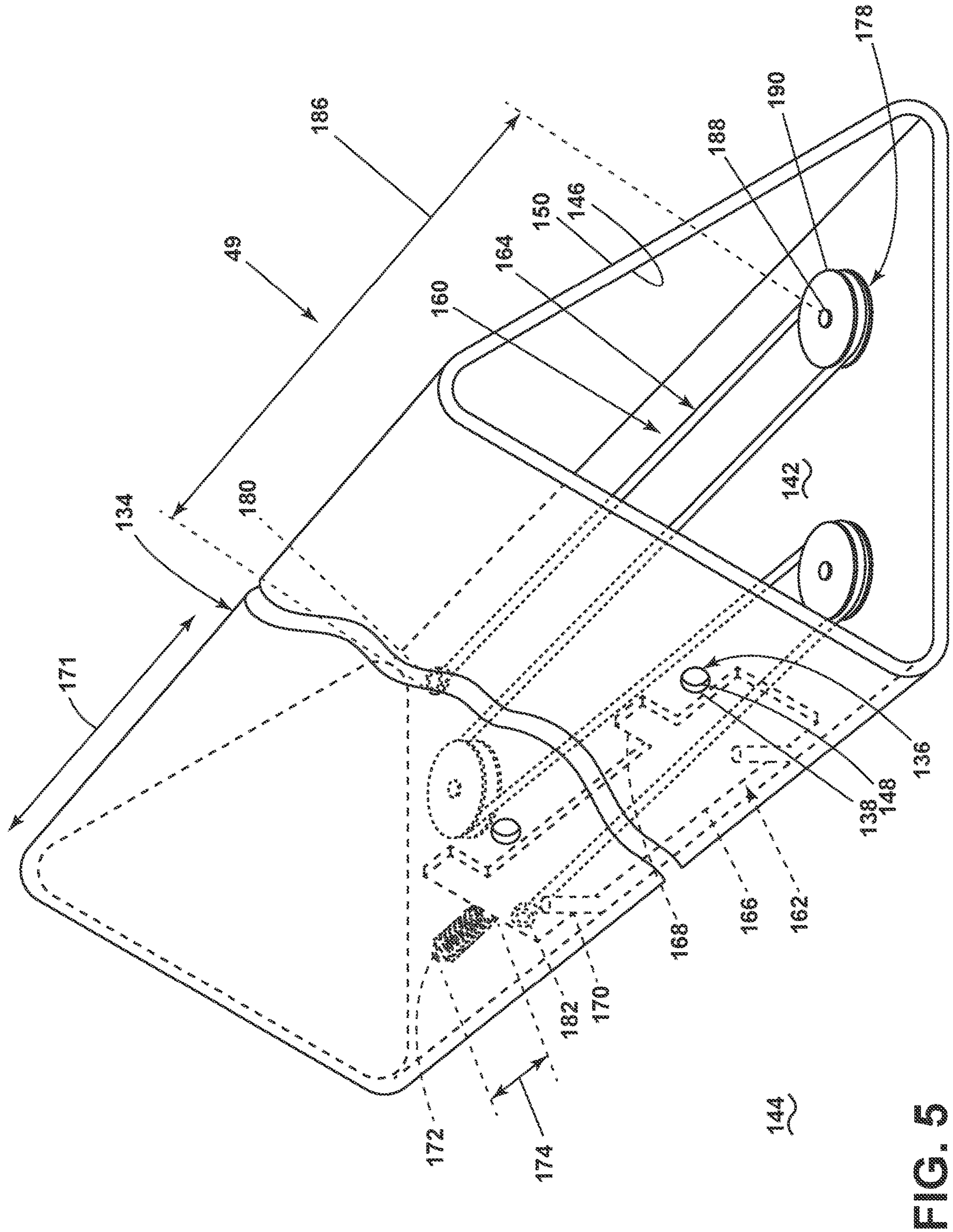
FIG. 5 is a schematic view of a portion of the sprayer of FIG. 4 and a baffle assembly within the sprayer in a first position.

FIG. 5 is an enlarged perspective view of a portion of the sprayer housing 134 of the sprayer 49. An interior 142 and an exterior 144 of the sprayer 49 can be defined by the sprayer housing 134. That is, the sprayer housing 134 can include an interior surface 146 that defines the interior 142 of the sprayer 49. While illustrated as having a triangular cross section, it is contemplated that the sprayer housing 134 can have any desired cross section, such as square, rectangular, or circular cross section, or a cross section including any known or combination of known polyhedron shapes. The cross-sectional shape is not limiting.

The at least one nozzle 136 passes through the sprayer housing 134 to fluidly couple the interior 142 with the exterior 144. While illustrated as cylindrical in shape, the at least one nozzle 136 can have an inlet 148 located at the interior surface 146 and the outlet 138 located at an exterior surface 150. The at least one nozzle 136 is illustrated as two nozzles, however any number of nozzles are contemplated. The at least one nozzle 136 can be of uniform cross section or diameter as the at least one nozzle 136 extends from the interior surface 146 to the exterior surface 150. Alternatively, it is contemplated that the cross section or diameter can increase, decrease, or change shape as the at least one nozzle 136 extends from the interior surface 146 to the exterior surface 150. It is further contemplated that the at least one nozzle 136 can be an angled passage. That is, the inlet 148 and the outlet 138 are not aligned or completely overlapping.

A baffle assembly 160 can be located in the interior 142 of the sprayer 49. The baffle assembly 160 can include a diverter 162 operably coupled to a thermally-responsive actuator 164, wherein the thermally-responsive actuator 164 has a second coefficient of thermal expansion that is different than the first coefficient of thermal expansion. It is contemplated that the second coefficient of thermal expansion of the thermally-responsive actuator 164 is less than the first coefficient of thermal expansion of the sprayer housing 134. It is further contemplated that the second coefficient of thermal expansion of the thermally-responsive actuator 164 is a value that is half of the value of the first coefficient of thermal expansion of the sprayer housing 134.

The diverter 162 is illustrated, by way of example, as a body or plate 166 having a set of protrusions 168, however it is contemplated that the diverter 162 can be of any shape. It is further contemplated that the baffle assembly 160 can include more than one diverter. The diverter 162 can include, but is not limited to, any one or more of nickel, aluminum, iron, copper, brass, bronze, or silver, stainless steel, carbon steel, ceramic, polyester, or other metallic or non-metallic materials having a low coefficient of thermal expansion. A rotatable component or a set of pivot arms 170 can movably couple or mount the diverter 162 to the sprayer 49 at the interior 142. That is, the set of pivot arms 170 couples to the interior surface 146 and the diverter 162 in such a way that the diverter 162 can move and/or rotate relative to the sprayer housing 134 in at least a longitudinal direction 171.

A biasing member 172 can couple the diverter 162 to at least the interior surface 146 of the sprayer 49. The biasing member 172 can be a spring or other elastic device that biases the diverter 162 to the resting or first position, as illustrated in FIG. 5. The biasing member 172 can have a first length 174 when the diverter 162 is in the relaxed or first position.

The thermally-responsive actuator 164 is illustrated as a cable or wire 164. A fixed, bounded, constrained, or restrained end 180 of the wire 164 is mounted or coupled to the interior surface 146. The wire 164 then passes over a set of pulleys 178, wherein the set of pulleys 178 are fixed or coupled to the interior surface 146 of the sprayer housing 134. A first distance 186 can be measured from the restrained end 180 of the wire 164 to a center 188 of a first pulley 190 of the set of pulleys 178 when the baffle assembly 160 or the diverter 162 is in the first position. A free, unbounded, unconstrained, or unrestrained end 182 of the wire 164 is coupled to the diverter 162.

The wire 164 can include any one or more of nickel, aluminum, iron, copper, brass, bronze, silver, stainless steel, carbon steel, or other materials with a low coefficient of thermal expansion. For example, when heated to approximately 54 degrees Celsius (130 degrees Fahrenheit), the wire 164 linearly expands 2 millimeters or less.

Figure 6:
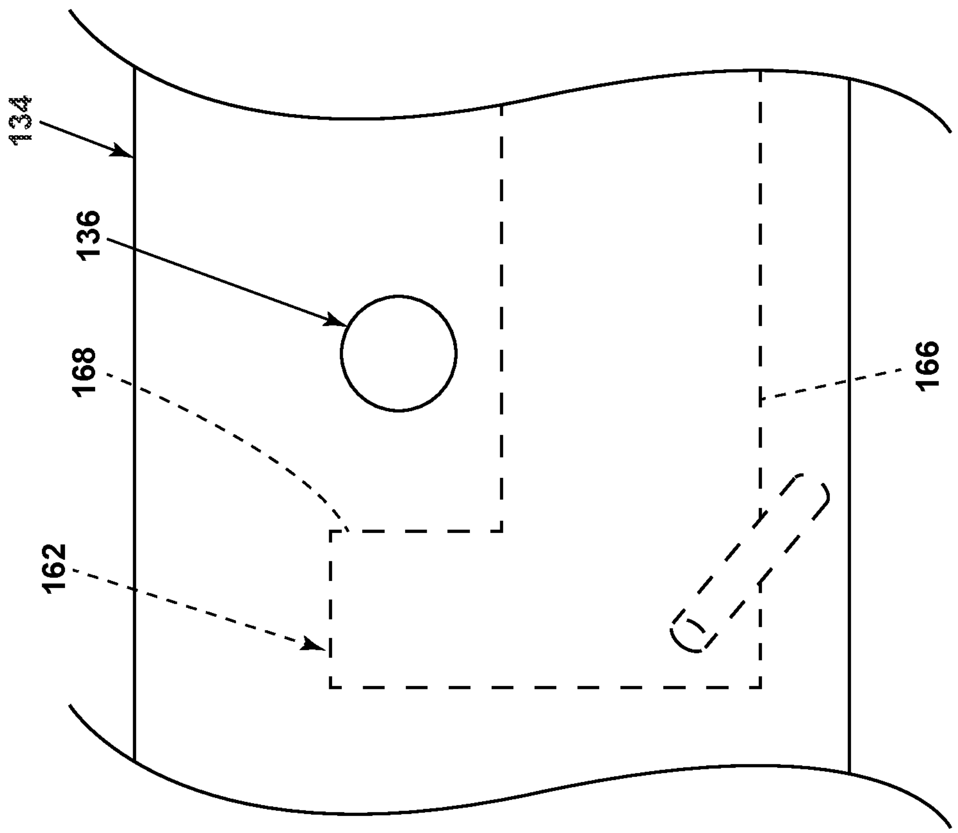
FIG. 6 is a schematic side view of a portion of the sprayer of FIG. 5 where the baffle assembly within the sprayer is in the first position.

FIG. 6 is an enlarged schematic side view of a portion of the sprayer housing 134, further illustrating the location of the diverter 162 in relationship to the at least one nozzle 136 when the diverter 162 is in the first position. The diverter 162 is next to or below the at least one nozzle 136 and does not overlap, occlude, or otherwise cover the at least one nozzle 136 when the diverter 162 is in the first position. That is, the plate 166 and the set of protrusions 168 are adjacent to but not occluding the at least one nozzle 136.

Figure 7:
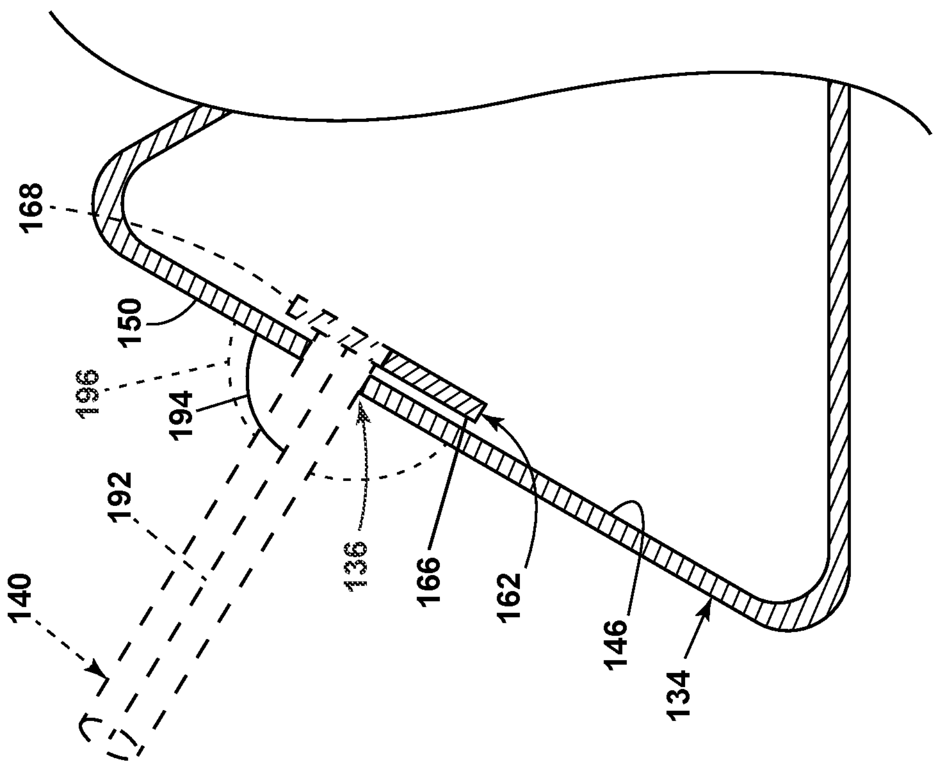
FIG. 7 is a schematic cross section of a portion the sprayer of FIG. 5 further illustrating at least one nozzle and a spray, where the baffle assembly within the sprayer is in the first position.

FIG. 7 is a schematic cross section of a portion of the sprayer housing 134 taken at the at least one nozzle 136 when the diverter 162 is in the first position. The spray 140 can have a first primary spray direction or first spray centerline 192 indicating the general direction of the spray emitted from the at least one nozzle 136.

A first angle 194 can be measured from the first spray centerline 192 to the exterior surface 150 of the sprayer housing 134. While illustrated as spaced from the interior surface 146, it is contemplated that the diverter 162 can be any distance from the interior surface 146, including flush to the interior surface 146. It is further contemplated that the gap or spacing between the diverter 162 or portions of the diverter 162 and the interior surface 146 of the sprayer housing 134 can be any distance and does not have to be uniform, as illustrated. Optionally, additional material 196 can be added to the exterior surface 150 adjacent the at least one nozzle 136.

Figure 8:
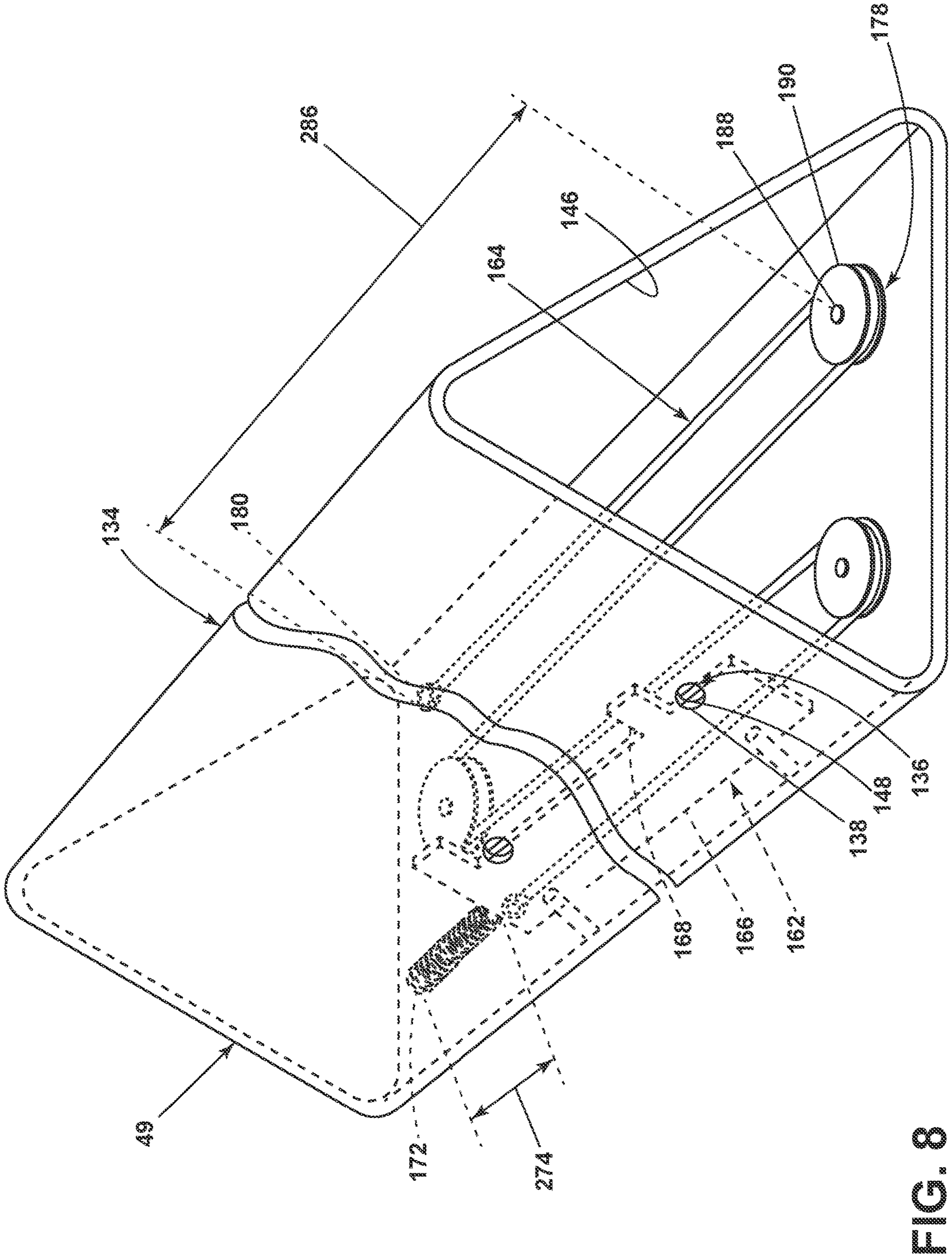
FIG. 8 is a schematic view of a portion of the sprayer of FIG. 4 where the baffle assembly is in a second position.

FIG. 8 is an enlarged perspective view of the portion of the sprayer housing 134 of the sprayer 49 similar to FIG. 6. FIG. 8 differs from FIG. 6 in that FIG. 8 illustrates the diverter 162 in a second position. When in the second position, the diverter 162 covers or blocks a portion of the inlet 148 of the at least one nozzle 136. As illustrated, by way of example, the plate 166 of the diverter 162 covers a lower portion of the inlet 148. While any range is contemplated, the plate 166 can block between 50%-80% of the inlet 148 when the diverter 162 is in the second position. The diverter 162, when in the second position, changes the direction of the spray from the at least one nozzle 136.

A second distance 286 can be measured from the restrained end 180 of the wire 164 to the center 188 of the first pulley 190 of the set of pulleys 178 when the diverter 162 is in the second position. The second distance 286 can be greater than the first distance 186, due to thermal expansion of the sprayer housing 134. When at the second distance 286, the wire 164 pulls the diverter 162 into the second position. In the second position, the diverter 162 pulls against the biasing member 172. The biasing member 172 can have a second length 274 when the diverter 162 is in the second position. The second length 274 is greater than the first length 174.

As illustrated, by way of non-limiting example, the sprayer housing 134 is formed of the first material having the first coefficient of thermal expansion and the wire 164 is formed from the second material having the second coefficient of thermal expansion. The diverter 162 is moved to the second position due to the difference in the first coefficient of thermal expansion and the second coefficient of thermal expansion. It is contemplated that the first and second materials can be any material for which the difference between the first coefficient of thermal expansion and the second coefficient of thermal expansion move the diverter 162 into the second position. It is further contemplated that the baffle assembly 160 can be designed such that the diverter 162 moves to the second position when the first coefficient of thermal expansion is less than the second coefficient of thermal expansion.

Figure 9:
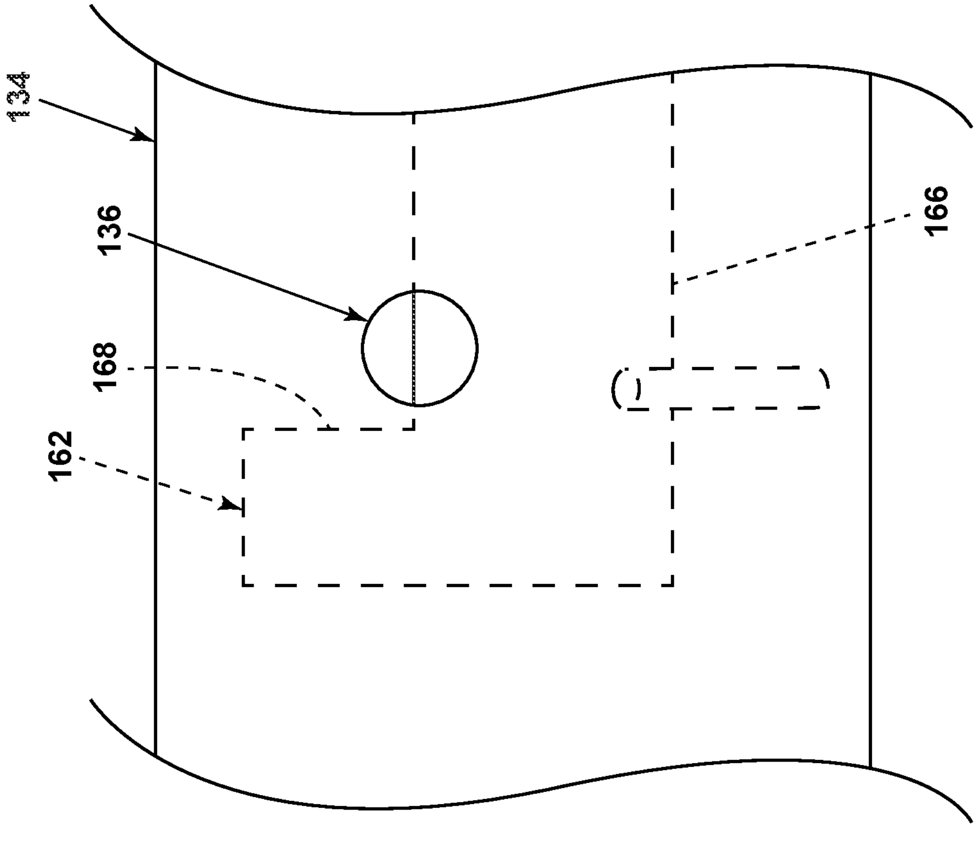
FIG. 9 is a schematic side view of a portion of the sprayer of FIG. 8 where the baffle assembly within the sprayer is in the second position.

FIG. 9 is an enlarged schematic side view of a portion of the sprayer housing 134, further illustrating the location of the diverter 162 in relationship to the at least one nozzle 136 when the diverter 162 is in the second position. The plate 166 of the diverter 162 covers the at least a portion of the at least one nozzle 136 when in the second position. That is, the plate 166 occludes, overlaps, or covers a portion of the at least one nozzle 136 when the diverter 162 is in the second position.

Figure 10:
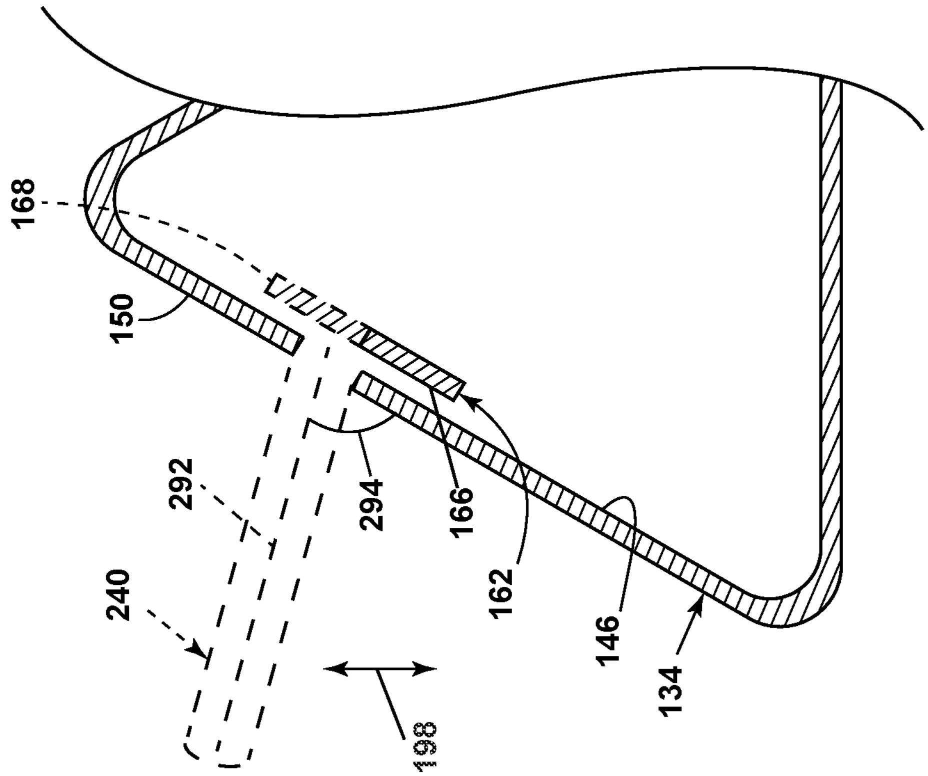
FIG. 10 is a schematic cross section of a portion the sprayer of FIG. 8 further illustrating at least one nozzle and a spray, where the baffle assembly within the sprayer is in the second position.

FIG. 10 is a schematic cross section of a portion of the sprayer housing 134 taken at the at least one nozzle 136 when the diverter 162 is in the second position. The spray 240 can have a second primary spray direction or second spray centerline 292 indicative of the general direction of the spray emitted from the at least one nozzle 136 when the diverter is in the second position.

A second angle 294 can be measured from the second spray centerline 292 to the exterior surface 150 of the sprayer housing 134. The second angle 294 is different from the first angle 194. That is, when moving the diverter 162 from the first position to the second position, the primary spray direction or spray centerline changes. Optionally, moving the diverter 162 from the first position to the second position can change the spray pattern.

As illustrated, by way of example, the distance between at least one of the interior surfaces 146 and the diverter 162 can remain constant from the first position to the second position. Alternatively, the distance between the interior surface 146 and of one or more portions of the diverter 162 can change from the first position to the second position. As illustrated, by way of non-limiting example, the plate 166 changes the direction of the spray 240 in a vertical direction 198.

Figure 11:
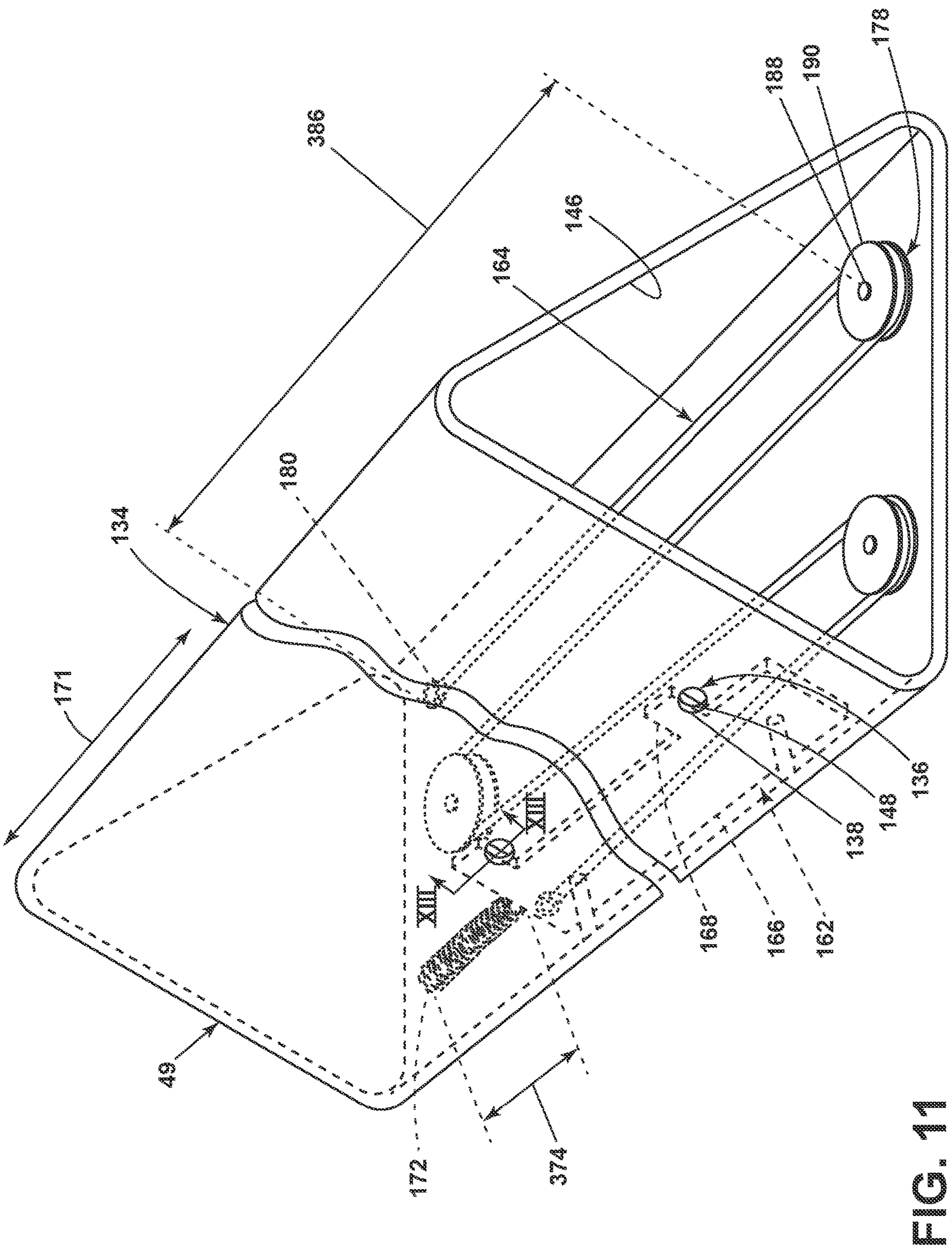
FIG. 11 is a schematic view of a portion of the sprayer of 4 where the baffle assembly is in a third position.

FIG. 11 is an enlarged perspective view of the portion of the sprayer housing 134 of the sprayer 49 similar to FIG. 6 and FIG. 8. FIG. 11 differs from FIG. 6 and FIG. 8 in that FIG. 11 illustrates the diverter 162 in a third position. When in the third position, the diverter 162 covers or blocks a portion of the inlet 148 of the at least one nozzle 136. As illustrated, by way of example, the set of protrusions 168 of the diverter 162 covers a side portion of the inlet 148. While any range is contemplated, the set of protrusions 168 can block between 50%-80% of the inlet 148 when the diverter 162 is in the third position. The diverter 162, when in the third position changes the lateral direction of the spray from the at least one nozzle 136. It is contemplated that in the third position or in a forth position (not shown), the set of protrusions 168 and the plate 166 can cover or block a portion of the inlet 148 to change the direction of the spray in more than one dimension or direction.

A third distance 386 can be measured from the restrained end 180 of the wire 164 to the center 188 of the first pulley 190 when the diverter 162 is in the third position. The third distance 386 is greater than the first distance 186. The third distance 386 is also greater than the second distance 286, due to thermal expansion of the sprayer housing 134. When at the third distance 386, the wire 164 pulls the diverter 162 into the third position. In the third position, the diverter 162 pulls against the biasing member 172. The biasing member 172 can have a third length 374 when the diverter 162 is in the third position. The third length 374 is greater than the second length 274 and the first length 174.

Figure 12:
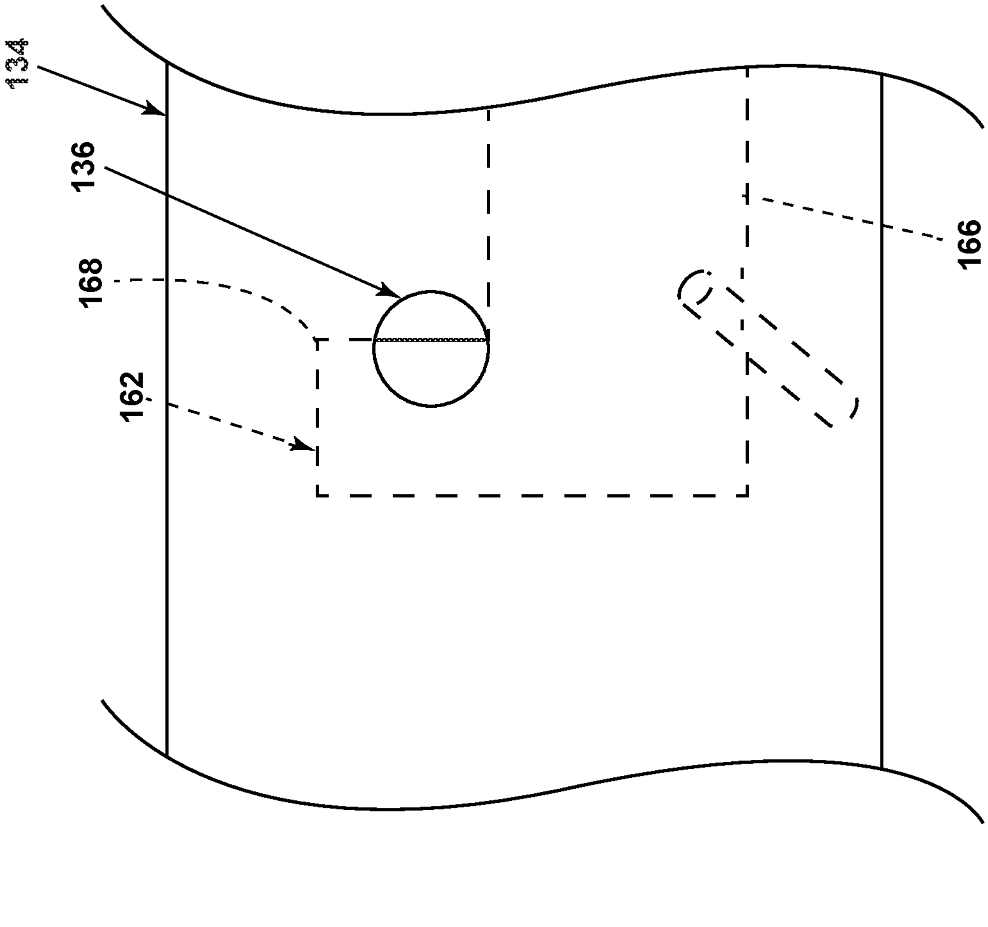
FIG. 12 is a schematic side view of a portion of the sprayer of FIG. 11 where the baffle assembly within the sprayer is in the third position.

FIG. 12 is an enlarged schematic side view of a portion of the sprayer housing 134, further illustrating the location of the diverter 162 in relationship to the at least one nozzle 136 when the diverter is in the third position. The set of protrusions 168 of the diverter 162 covers the at least a portion of the at least one nozzle 136 when in the third position. That is, the set of protrusions 168 occludes, overlaps, or covers a portion of the at least one nozzle 136 when the diverter 162 is in the third position.

Figure 13:
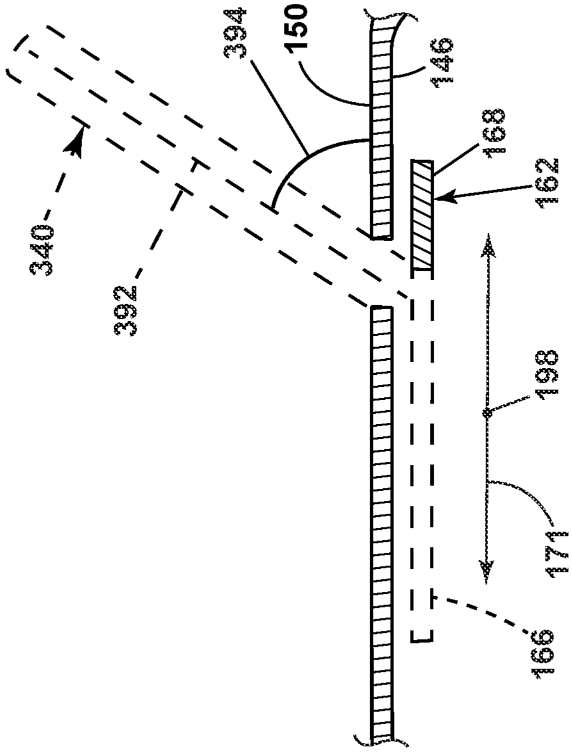
FIG. 13 is a schematic cross section of a portion the sprayer of FIG. 11 further illustrating at least one nozzle and a spray, where the baffle assembly within the sprayer is in the third position.

FIG. 13 is a top view schematic cross section of a portion of the sprayer housing 134 taken at the at least one nozzle 136 when the diverter 162 is in the third position. The spray 340 can have a third spray centerline 392. A third angle 394 can be measured from the third spray centerline 392 to the exterior surface 150 of the sprayer housing 134. As illustrated, by way of example, the distance between at least one of the interior surfaces 146 and the diverter 162 can remain constant from the first position to the third position. Alternatively, the distance between the interior surface 146 and of one or more portions of the diverter 162 can change as the diverter 162 moves from the first to the second and third positions.

Figure 14:
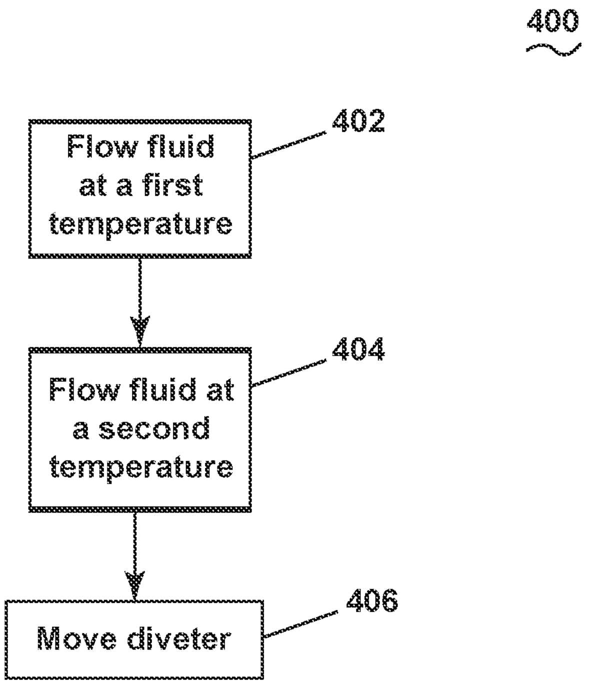
FIG. 14 is a flowchart diagram illustrating a method of for changing the direction of spray from the sprayer of FIG. 4.

FIG. 14 depicts a flow chart diagram used to illustrate a method 400 for changing a direction or primary spray direction of spray 140 from the sprayer 49 located in the treating chamber 16 of the dishwasher 10. The controller 22 allows the recirculation system 50 to provide fluid to the sprayer 49. At 402, fluid flows at a first temperature below a first predetermined temperature into the sprayer housing 134. The fluid exits the sprayer housing 134 and flows into the treating chamber 16 via at least one nozzle 136. The first predetermined temperature can be, for example, between or equal to 38-49 degrees Celsius (100-120 degrees Fahrenheit). The fluid can flow through the sprayer housing 134 in a generally longitudinal direction 171. By way of non-limiting example, the fluid can flow is over the first pulley 190 before reaching the at least one nozzle 136 or the biasing member 172. The diverter 162 remains in the first position while the fluid flowing through the sprayer housing 134 remains below the first predetermined temperature.

The controller 22 can activate the heating system 90, heating the fluid prior entering the sprayer housing 134. At 404, fluid flows at a second temperature that is beyond the first predetermined temperature, but below a second predetermined temperature. The second predetermined temperature can be, for example, between or equal to 54-60 degrees Celsius (130-140 degrees Fahrenheit). Once the fluid flowing through the sprayer housing 134 is at or above the first predetermined temperature, but below the second predetermined temperature, the thermally-responsive actuator 164, at 406, pulls the diverter 162 into the second position.

The thermally-responsive actuator 164 is able to pull the diverter 162 into the second position due to the difference between the first coefficient of thermal expansion of the sprayer housing 134 and the second coefficient of thermal expansion of the thermally-responsive actuator or wire 164. That is, as the heated fluid enters the sprayer housing 134, the sprayer housing 134 expands at a greater rate than the thermally-responsive actuator 164. As the sprayer housing 134 expands in response to the fluid flowing at the second temperature, the first distance 186 between the restrained end 180 and the first pulley 190 increases to the second distance 286. Since the wire 164 does not significantly lengthen (lower coefficient of thermal expansion), the increase in distance between the restrained end 180 and the first pulley 190 provides the tension in the wire 164 needed to pull the diverter 162 at the unrestrained end 182 of the wire 164 from the first position to the second position. As a result, the biasing member 172 stretches. The length of the biasing member 172 changes from the first length 174 to the second length 274.

When in the second position, the diverter 162 occludes, overlaps or covers at least a portion of the at least one nozzle 136. This occlusion can occur gradually as the diverter 162 moves from the first position to the second position in response to heating the fluid.

The occlusion or partial overlap of the plate 166 of the diverter 162 to the at least one nozzle 136 causes a change in the primary spray direction of the fluid as it exits the at least one nozzle 136. Changing the primary spray direction of the spray during a cycle of operation can improve the quality of the wash. That is, starting with the spray 140 at the first angle 194 and transitioning (during heating) to the spray 240 at the second angle 294 provides spray at all angles between the first angle 194 and the second angle 294. As the dishes experience spray through a range of angles, the dishes can become cleaner than if they were experiencing a single spray angle. By way of example, the change in primary spray direction of the spray from the first position to the second position can be in the vertical direction 198.

Optionally, the heating system 90 can provide fluid to the sprayer housing 134 at temperatures at or above the second predetermined temperature. Once the fluid flowing through the sprayer housing 134 is at or above the second predetermined temperature, the thermally-responsive actuator 164 can pull the diverter 162 into the third position. This happens as a result of further expansion of the sprayer housing 134 and an increase from the second distance 286 to the third distance 386 between the restrained end 180 and the first pulley 190. As a result, the biasing member 172 stretches from the second length 274 to the third length 374.

When in the third position, the set of protrusions 168 of the diverter 162 overlap at least a portion of the at least one nozzle 136. This overlap can occur gradually as the diverter 162 moves from the second position to the third position.

The overlap of the set of protrusions 168 can cause a change in the direction of the spray that is in the longitudinal direction 171. Therefore, transitioning between the second position and the third position provides a range of spray that can be two dimensional, starting with the spray 240 at the second angle 294 and moving to the spray 340 at the third angle 394. As the dishes experience spray through a range of angles in multiple dimensions, the dishes can become cleaner than experiencing a single spray angle.

At or near the end of the cycle of operation, the sprayer housing 134 and thermally-responsive actuator 164 can cool. The distance between the restrained end 180 and the first pulley 190 can return to the first length 174 and the biasing member 172 can aid in the return of the diverter 162 to the first position.

Benefits associated with the disclosure described herein include using a diverter assembly to change the direction of the spray of a stationary spray nozzle during a cycle of operation to improve the quality of the wash. As described herein, the direction of the spray is altered by a thermal actuator and diverter located within the sprayer housing. The range of spray provided by the diverter assembly improves the wash performance when compared to a stationary sprayer with change in direction of the spray.

Further, there are no gears or complex mechanical mechanisms required by the diverter assembly as disclosed herein. The absence of gears or complex mechanical mechanisms can extend the life of the stationary sprayer.

Additionally, the diverter assembly is contained within the stationary sprayer, making the stationary sprayer and the diverter assembly easily replaceable compared to diverter assemblies with components that are exterior to the sprayer.

The change in direction due to the diverter assembly can be combined with changing the velocity (fluid flow rate) or volume of fluid flowing through the sprayer housing. For example, the motor speeds can be changed to increase or decrease the velocity or volume of fluid flowing through the sprayer housing. The changing of the velocity of volume of the fluid flowing through the sprayer housing can change the direction of the spray by increasing or decreasing the first, second, or third angles of spray.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. While aspects of the disclosure have been specifically described in connection with certain specific details thereof, it is to be understood that this is by way of illustration and not of limitation. Reasonable variation and modification are possible within the scope of the forgoing disclosure and drawings without departing from the spirit of the disclosure, which is defined in the appended claims.

Further aspects of the disclosure are provided by the subject matter of the following clauses:

A dishwasher for treating dishes according to a cycle of operation, the dishwasher comprising a tub at least partially defining a treating chamber, a dish rack received within the treating chamber, configured for receiving the dishes for treatment during the cycle of operation, and moveable relative to the tub, and a stationary sprayer located within the treating chamber, configured to emit spray into the dish rack, the stationary sprayer comprising a sprayer housing defining an interior and an exterior, with at least one nozzle passing through the sprayer housing to fluidly couple the interior with the exterior, a diverter located in the interior and moveable relative to the at least one nozzle, and a thermally-responsive actuator located in the interior and operably coupled to the diverter to move the diverter relative to the at least one nozzle in response to a temperature of the spray emitted from the interior through the at least one nozzle.

The dishwasher of any preceding clause wherein the thermally-responsive actuator comprises an unrestrained end and a restrained end, wherein the unrestrained end is coupled to the diverter and the restrained end is coupled to the interior of the stationary sprayer.

The dishwasher of any preceding clause wherein the sprayer housing comprises a first material having a first coefficient of thermal expansion and the thermally-responsive actuator comprises a second material having a second coefficient of thermal expansion that is different than the first coefficient of thermal expansion.

The dishwasher of any preceding clause wherein the first coefficient of thermal expansion is at least two times greater than the second coefficient of thermal expansion.

The dishwasher of any preceding clause wherein the thermally-responsive actuator comprises at least one of nickel, aluminum, iron, copper, brass, bronze, or silver and the sprayer housing comprises polypropylene, polyethylene, polyvinyl, or polystyrene.

The dishwasher of any preceding clause wherein the thermal expansion of the sprayer housing increases a distance between at least the restrained end of the thermally-responsive actuator and at least one pulley of a set of pulleys, wherein the thermally-responsive actuator pulls the diverter from a first position to a second position based on the thermal expansion of the sprayer housing.

The dishwasher of any preceding clause wherein the diverter further includes at least one rotatable component that moveably couples the diverter to the interior of the stationary sprayer.

The dishwasher of any preceding clause wherein the diverter moves from a first position to a second position in response to the temperature of the spray emitted from the interior through the at least one nozzle.

The dishwasher of any preceding clause wherein the diverter includes a plate that overlaps at least a portion of the at least one nozzle when the diverter is in the second position.

The dishwasher of any preceding clause wherein the spray emitted from the at least one nozzle is in a third direction when the diverter is in a third position.

A method for changing a direction of spray from a sprayer located in a treating chamber of a dishwasher, the method comprising flowing fluid at a first temperature that is below a first predetermined temperature into a sprayer housing of a stationary sprayer, wherein the fluid exits the sprayer housing into the treating chamber through at least one nozzle, flowing fluid at a second temperature, greater than the first temperature, wherein the second temperature is at or greater than the first predetermined temperature and less than a second predetermined temperature, and moving a diverter operably coupled to a thermally-responsive actuator and located at an interior of the sprayer housing, from a first position to a second position in response to the fluid flowing at the second temperature, wherein a portion of the diverter occludes at least a portion of the at least one nozzle when the diverter is in the second position.

The method of any preceding clause wherein the occlusion of the at least a portion of the at least one nozzle changes a primary spray direction of spray emitted from a first angle to a second angle.

The method of any preceding clause, further comprising flowing fluid at a third temperature, wherein the third temperature is at or greater than the second predetermined temperature, and moving the diverter from the second position to a third position in response to the fluid flowing at the third temperature, wherein another portion of the diverter occludes at least a portion of the at least one nozzle when the diverter is in the third position.

The method of any preceding clause wherein the occlusion of the at least a portion of the at least one nozzle changes the primary spray direction of the spray emitted from the second angle to a third angle.

The method of any preceding clause wherein the flowing of the fluid at the second temperature or the third temperature causes the sprayer housing to expand a greater distance in a longitudinal direction than the thermally-responsive actuator.

A dishwasher for treating dishes according to a cycle of operation, the dishwasher comprising a tub at least partially defining a treating chamber, a dish rack received within the treating chamber, configured for receiving the dishes for treatment during the cycle of operation, and a sprayer located within the treating chamber, configured to emit spray into the dish rack, the sprayer comprising a sprayer housing defining an interior and an exterior, with at least one nozzle passing through the sprayer housing to fluidly couple the interior with the exterior, and a baffle assembly located in the interior, the baffle assembly comprising a diverter moveable relative to the at least one nozzle, a thermally-responsive actuator coupled at an unrestrained end to the diverter and coupled at a restrained end to an interior surface, and a set of pulleys coupled to the interior surface, wherein the set of pulleys receive a portion of the thermally-responsive actuator between the restrained end and the unrestrained end, wherein an increased distance between the restrained end of the thermally-responsive actuator and a first pulley of the set of pulleys provides tension required to move the diverter from a first position to a second position.

The dishwasher of any preceding clause wherein the baffle assembly further comprises a biasing member coupling the interior surface to the diverter and biasing the diverter to the first position.

The dishwasher of any preceding clause wherein the sprayer housing comprises first material having a first coefficient of thermal expansion, the thermally-responsive actuator comprises a second material having a second coefficient of thermal expansion, wherein the first coefficient of thermal expansion is different than the second coefficient of thermal expansion.

The dishwasher of any preceding clause wherein the first coefficient of thermal expansion is at least double the second coefficient of thermal expansion.

The dishwasher of any preceding clause wherein the increased distance between the restrained end of the thermally-responsive actuator and the first pulley is in response to a temperature of the spray emitted from the interior through the at least one nozzle.

What is claimed is:

1. A dishwasher for treating dishes according to a cycle of operation, the dishwasher comprising:

a tub at least partially defining a treating chamber, a dish rack received within the treating chamber, configured for receiving the dishes for treatment during the cycle of operation, and moveable relative to the tub; and a stationary sprayer located within the treating chamber, configured to emit spray into the dish rack, the stationary sprayer comprising:

a sprayer housing defining an interior and an exterior, with at least one nozzle passing through the sprayer housing to fluidly couple the interior with the exterior, a diverter located in the interior and moveable relative to the at least one nozzle;

at least one rotatable component configured to movably couple the diverter within the interior of the sprayer housing for longitudinal movement of the diverter in at least a first direction relative to the sprayer housing; and a thermally-responsive actuator located in the interior and operably coupled to the diverter to move the diverter relative to the at least one nozzle in at least a second direction, different from the first direction, in response to a temperature of the spray emitted from the interior through the at least one nozzle; and wherein the thermally-responsive actuator is coupled at a first end to the diverter and is coupled at a second end to an interior surface, and further wherein the at least one rotatable component comprises a set of pulleys coupled to the interior surface, wherein the set of pulleys receive a portion of the thermally-responsive actuator between the second end and the first end, and further wherein an increased distance between the second end of the thermally-responsive actuator and a first pulley of the set of pulleys provides tension required to move the diverter from a first position to a second position.

2. The dishwasher of claim 1 wherein the thermally-responsive actuator comprises a first end and a second end, wherein the first end is coupled to the diverter and the second end is coupled to the interior of the stationary sprayer.

3. The dishwasher of claim 1 wherein the sprayer housing comprises a first material having a first coefficient of thermal expansion and the thermally-responsive actuator comprises a second material having a second coefficient of thermal expansion that is different than the first coefficient of thermal expansion.

4. The dishwasher of claim 3 wherein the first coefficient of thermal expansion is at least two times greater than the second coefficient of thermal expansion.

5. The dishwasher of claim 3 wherein the thermally-responsive actuator comprises at least one of nickel, aluminum, iron, copper, brass, bronze, or silver and the sprayer housing comprises polypropylene, polyethylene, polyvinyl, or polystyrene.

6. The dishwasher of claim 5 wherein the thermal expansion of the sprayer housing increases a distance between at least the second end of the thermally-responsive actuator and at least one pulley of a set of pulleys, wherein the thermally-responsive actuator pulls the diverter from the first position to the second position based on the thermal expansion of the sprayer housing.

7. The dishwasher of claim 1 wherein the diverter moves from the first position to the second position in response to the temperature of the spray emitted from the interior through the at least one nozzle.

8. The dishwasher of claim 7 wherein the diverter includes a plate that overlaps at least a portion of the at least one nozzle when the diverter is in the second position.

9. The dishwasher of claim 8 wherein the spray emitted from the at least one nozzle is in a third direction when the diverter is in a third position.

10. A method for changing a direction of the spray from the stationary sprayer located in the treating chamber of the dishwasher of claim 1, the method comprising:

flowing fluid at a first temperature that is below a first predetermined temperature into the sprayer housing of the stationary sprayer, wherein the fluid exits the sprayer housing into the treating chamber through the at least one nozzle;

flowing fluid at a second temperature, greater than the first temperature, wherein the second temperature is at or greater than the first predetermined temperature and less than a second predetermined temperature; and moving the diverter, that is operably coupled to the thermally-responsive actuator located at the interior of the sprayer housing, from the first position to the second position in response to the fluid flowing at the second temperature, wherein a portion of the diverter occludes at least a portion of the at least one nozzle when the diverter is in the second position.

11. The method of claim 10 wherein the occlusion of the at least a portion of the at least one nozzle changes a primary spray direction of the spray emitted from a first angle to a second angle.

12. The method of claim 11, further comprising flowing fluid at a third temperature, wherein the third temperature is at or greater than the second predetermined temperature, and moving the diverter from the second position to a third position in response to the fluid flowing at the third temperature, wherein another portion of the diverter occludes at least a portion of the at least one nozzle when the diverter is in the third position.

13. The method of claim 12 wherein the occlusion of the at least a portion of the at least one nozzle changes the primary spray direction of the spray emitted from the second angle to a third angle.

14. The method of claim 13 wherein the flowing of the fluid at the second temperature or the third temperature causes the sprayer housing to expand a greater distance in the longitudinal direction than the thermally-responsive actuator.

15. A dishwasher for treating dishes according to a cycle of operation, the dishwasher comprising:

a tub at least partially defining a treating chamber, a dish rack received within the treating chamber, configured for receiving the dishes for treatment during the cycle of operation, and moveable relative to the tub; and a sprayer located within the treating chamber, configured to emit spray into the dish rack, the sprayer comprising:

a sprayer housing mounted in a stationary position to the dish rack, the spray housing defining an interior and an exterior, with at least one nozzle passing through the sprayer housing to fluidly couple the interior with the exterior;

a diverter plate located in the interior and moveable relative to the at least one nozzle; and a thermally-responsive actuator wire located in the interior and operably coupled to the diverter plate, the thermally-responsive actuator wire wound about at least one pulley and configured to move the diverter plate in at least a first direction relative to the at least one nozzle in response to a temperature of the spray emitted from the interior through the at least one nozzle; and wherein the thermally-responsive actuator is coupled at a first end to the diverter and is coupled at a second end to an interior surface, and further comprising at least one rotatable component comprising a set of pulleys coupled to the interior surface, wherein the set of pulleys receive a portion of the thermally-responsive actuator between the second end and the first end, and further wherein an increased distance between the second end of the thermally-responsive actuator and a first pulley of the set of pulleys provides tension required to move the diverter from a first position to a second position.

16. A dishwasher for treating dishes according to a cycle of operation, the dishwasher comprising:

a tub at least partially defining a treating chamber, a dish rack received within the treating chamber, configured for receiving the dishes for treatment during the cycle of operation, and moveable relative to the tub; and a stationary sprayer located within the treating chamber, configured to emit spray into the dish rack, the stationary sprayer comprising:

a sprayer housing defining an interior and an exterior, with at least one nozzle passing through the sprayer housing to fluidly couple the interior with the exterior, a diverter located in the interior and moveable relative to the at least one nozzle to a first position to create a first spray pattern, a second position different from the first position to create a second spray pattern, and a third position different from the first position and the second position to create a third spray pattern;

a thermally-responsive actuator located in the interior and operably coupled to the diverter to move the diverter relative to the at least one nozzle in response to a temperature of the spray emitted from the interior through the at least one nozzle; and wherein the thermally-responsive actuator is coupled at a first end to the diverter and is coupled at a second end to an interior surface, and further comprising at least one rotatable component comprising a set of pulleys coupled to the interior surface, wherein the set of pulleys receive a portion of the thermally-responsive actuator between the second end and the first end, and further wherein an increased distance between the second end of the thermally-responsive actuator and a first pulley of the set of pulleys provides tension required to move the diverter from a first position to a second position.

* * * * *